(12) United States Patent
Jiang

(10) Patent No.: US 9,099,888 B2
(45) Date of Patent: Aug. 4, 2015

(54) DEVICE FOR RECOVERING ELECTRIC ENERGY IN AC MOTOR-DRIVEN ELECTRIC VEHICLE

(71) Applicant: Xiaoping Jiang, Taizhou (CN)

(72) Inventor: Xiaoping Jiang, Taizhou (CN)

( * ) Notice: Subject to any disclaimer, the term of this patent is extended or adjusted under 35 U.S.C. 154(b) by 135 days.

(21) Appl. No.: 13/952,667

(22) Filed: Jul. 28, 2013

(65) Prior Publication Data

US 2013/0314005 A1    Nov. 28, 2013

Related U.S. Application Data

(63) Continuation-in-part of application No. PCT/CN2011/081906, filed on Nov. 8, 2011.

(30) Foreign Application Priority Data

Feb. 11, 2011    (CN) .......................... 2011 1 0035954

(51) Int. Cl.
*H02J 7/14* (2006.01)
*B60L 11/18* (2006.01)
*H02J 7/02* (2006.01)

(52) U.S. Cl.
CPC ............ *H02J 7/14* (2013.01); *B60L 11/1811* (2013.01); *H02J 7/02* (2013.01); *H02J 7/1492* (2013.01); *Y02T 10/7005* (2013.01); *Y02T 10/92* (2013.01); *Y02T 90/127* (2013.01); *Y02T 90/14* (2013.01)

(58) Field of Classification Search
USPC ............... 318/139, 148, 400.3; 320/107, 109; 363/15, 132
See application file for complete search history.

(56) References Cited

U.S. PATENT DOCUMENTS

| 4,237,371 | A | * | 12/1980 | LeBouder | 377/2 |
|---|---|---|---|---|---|
| 5,350,994 | A | * | 9/1994 | Kinoshita et al. | 320/116 |
| 5,514,915 | A | * | 5/1996 | Kim et al. | 307/64 |
| 5,579,197 | A | * | 11/1996 | Mengelt et al. | 361/93.4 |
| 8,502,496 | B2 | * | 8/2013 | Hofheinz | 320/104 |
| 2002/0141216 | A1 | * | 10/2002 | Ishihara et al. | 363/132 |
| 2008/0211437 | A1 | * | 9/2008 | Tamai et al. | 318/148 |
| 2009/0189581 | A1 | * | 7/2009 | Lawson et al. | 323/282 |
| 2009/0251924 | A1 | * | 10/2009 | Todd | 363/15 |
| 2011/0181236 | A1 | * | 7/2011 | Yang et al. | 320/107 |
| 2011/0273139 | A1 | * | 11/2011 | Hofheinz | 320/109 |
| 2012/0218027 | A1 | * | 8/2012 | Ioannidis | 327/513 |
| 2012/0218710 | A1 | * | 8/2012 | Ioannidis | 361/697 |
| 2012/0221287 | A1 | * | 8/2012 | Ioannidis | 702/132 |
| 2012/0221288 | A1 | * | 8/2012 | Ioannidis | 702/136 |
| 2013/0033038 | A1 | * | 2/2013 | Rozman et al. | 290/31 |
| 2014/0001988 | A1 | * | 1/2014 | Kanzaki | 318/400.3 |

* cited by examiner

*Primary Examiner* — Paul Ip
(74) *Attorney, Agent, or Firm* — Matthias Scholl P.C.; Mattias Scholl

(57) ABSTRACT

A device for recovering electric energy in an AC motor-driven electric vehicle. The device includes a battery, a single-phase or three-phase inverter, a single-phase or three-phase inductor, an AC motor, a rectifier bridge or a second inverter, and a charger. The anode and the cathode of the battery are connected to input ends of the inverter, respectively. An output end of the inverter is connected to the AC motor via a primary coil of the inductor. An output end of a secondary coil of the single-phase or three-phase inductor is connected to an input end of the rectifier bridge or the second inverter. Output ends of the rectifier bridge are connected to the anode and the cathode of the battery, respectively. The charger is connected to the anode and the cathode of the battery for supplying power from an external power supply.

12 Claims, 3 Drawing Sheets

DEVICE FOR RECOVERING ELECTRIC ENERGY IN AC MOTOR-DRIVEN ELECTRIC VEHICLE

CROSS-REFERENCE TO RELATED APPLICATIONS

This application is a continuation-in-part of International Patent Application No. PCT/CN2011/081906 with an international filing date of Nov. 8, 2011, designating the United States, now pending, and further claims priority benefits to Chinese Patent Application No. 201110035954.2 filed Feb. 11, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a device for recovering electric energy in an AC motor-driven electric vehicle that employs an inductor to recover the electric energy in the process of current rectification. The invention is particularly applicable to electric bicycles, electric tricycles, electric cars, electric boats, household electric appliances, industrial electric appliances, and electric motor devices.

2. Description of the Related Art

A typical electric vehicle adopts a rectifier to compensate for its start and operation. However, the rectifier consumes a large amount of energy in the start and operation, thereby resulting in an energy loss of batteries or power grids. Although electric energy can be reserved by using a flywheel, a double-layer capacitance, or an electric generator, all these devices have a high energy consumption and low energy recovery efficiency thereby resulting in a high energy consumption of the electric vehicle.

SUMMARY OF THE INVENTION

In view of the above-described problems, it is one objective of the invention to provide a device for recovering electric energy in an AC motor-driven electric vehicle. The device employs a single-phase or three-phase inductor to rectify the current and regulate the voltage. A primary coil of the single-phase or three-phase inductor is in series connection with a load of an AC motor. When the AC motor works, the current and the voltage on the primary coil of the single-phase or three-phase inductor produce an electromagnetic induction and influence a secondary coil of the single-phase or three-phase inductor to produce an AC current and voltage on the secondary coil. The AC current and voltage is further rectified and inverted into a direct current by the rectifier bridge or a second inverter, and the direct current is finally input to the battery for electric energy recovery. The recovery rate of the electric energy is 25% above.

To achieve the above objective, in accordance with one embodiment of the invention, there is provided a device for recovering electric energy in an AC motor-driven electric vehicle, the device comprising: a battery; a single-phase or three-phase inverter (a DC to AC inverter); a single-phase or three-phase inductor; an AC motor; a rectifier bridge (a high-power diode rectifier bridge) or a second inverter (an AC to DC inverter); and a charger. An anode and a cathode of the battery are connected to input ends of the single-phase or three-phase inverter, respectively. An output end of the single-phase or three-phase inverter is connected to the AC motor via a primary coil of the single-phase or three-phase inductor. An output end of a secondary coil of the single-phase or three-phase inductor is connected to an input end of the rectifier bridge or the second inverter. Output ends of the rectifier bridge are connected to the anode and the cathode of the battery, respectively. The charger is connected to the anode and the cathode of the battery for supplying power.

In a class of this embodiment, the AC motor is provided with a speed controller for controlling a rotary speed of the AC motor.

In a class of this embodiment, the battery is a battery pack or a single battery.

In a class of this embodiment, the battery comprises a power manager for management of charging and discharging of the battery. The power manager employs a commercially available power manager module.

In a class of this embodiment, the single-phase or three-phase inductor comprises: a magnetic core, a coil, a mounting bracket, a skeleton, and an insulating material. The magnetic core is made of a ferrite, a rare earth magnetic material, or a silicon steel sheet. The magnetic core uses a magnetic ring, a magnetic cylinder, and the like to form a magnetic circuit. The coil is made of an enamel-covered wire or an insulating conductive material. The single-phase or three-phase inductor is assembled by winding the coil on the skeleton, inserting the magnetic core inside the coil, fixing the coil on the mounting bracket, and using the insulating material for package.

Working principals of the invention is as follows:

The anode and cathode of the battery output a direct current, which is inverted into an alternative current by the single-phase or three-phase inverter. The output end of the single-phase or three-phase inverter is connected to the AC motor via the primary coil of the single-phase or three-phase inductor to form a circuit. Thus, the AC motor is started, and the speed of the AC motor is controlled by the speed controller.

During the running of the AC motor, the primary coil of the single-phase or three-phase inductor produces a flux due to the current and the voltage, thereby rectifying the current and regulating the voltage. In the meanwhile, an induced electromotive force is produced and further influences the secondary coil of the single-phase or three-phase inductor, so that a voltage and a current are produced on the secondary coil of the single-phase or three-phase inductor. The current is rectified by the rectifier bridge or the second inverter into a direct current that is reserved in the battery. Thus, the electric energy is recovered, and the recovery rate exceeds 25%. The amount of the recovered electric energy depends on the power consumption of the motor. The higher the power consumption of the motor, the larger current and the larger voltage produced on the secondary coil of the single-phase or three-phase inductor.

When the battery does not have enough energy, the charger is connected to the anode and the cathode of the battery for supplying power from an external power supply.

Advantages of the invention are as follows:

The device for recovering the electric energy for the AC motor-driven electric vehicle of the invention has a reasonable design, compact structure, and is convenient for use. The device employs the battery for charging and discharging, thereby enabling the battery to have a good activation effect, prolonging the service life of the battery, and increasing the capacity of the battery. As the single-phase or three-phase inductor having a magnetic inductance is in series connection with the motor, during the process of speed regulation, the power factor of the single-phase or three-phase inductor is increased by exceeding 0.95, the efficiency exceeds 98%. The efficiency of the single-phase or three-phase inductor is increased by 2%, and the loss of the single-phase or three-phase inductor is reduced by ½.

The device of the invention employs the inductor to rectify the current and regulate the voltage. The primary coil of the single-phase or three-phase inductor is in series connection with the load of the AC motor. When the AC motor works, the current and the voltage on the primary coil of the single-phase or three-phase inductor produce an electromagnetic induction and influence the secondary coil of the single-phase or three-phase inductor to produce the AC current and voltage on the secondary coil. The AC current and voltage is further rectified and inverted into a direct current by the rectifier bridge or the second inverter, and the direct current is input to the battery for electric energy recovery. The recovery rate of the electric energy is 25% above.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a device for recovering electric energy in an AC motor-driven electric vehicle are described hereinbelow combined with the drawings.

Example 1

Figure 1:
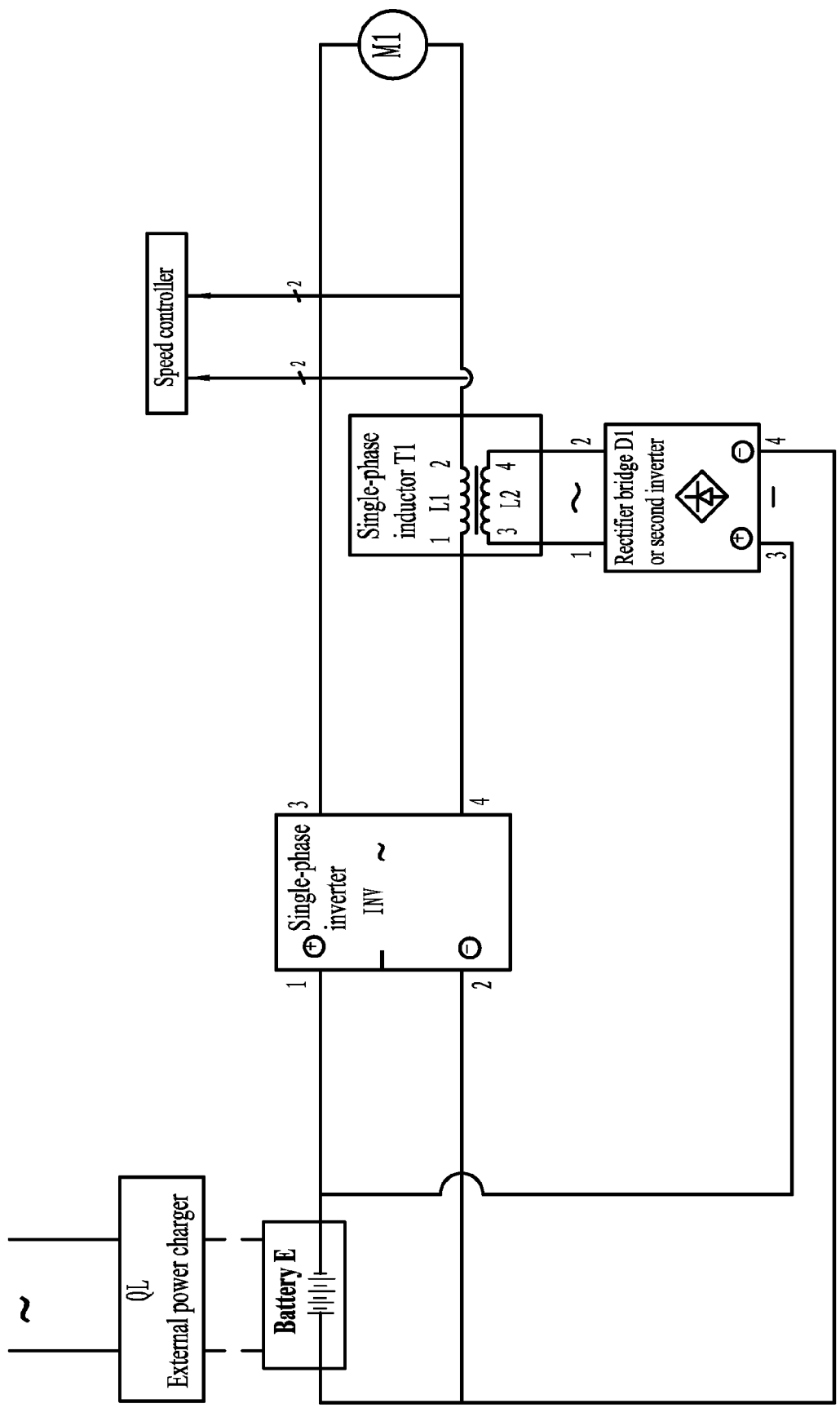
FIG. 1 is a structure diagram of a device for recovering electric energy in an AC motor-driven electric vehicle in accordance with Example 1.

As shown in FIG. 1, a device for recovering electric energy in an AC motor-driven electric vehicle, comprises: a battery E; a single-phase inverter INV1 (a DC to AC inverter); a single-phase inductor T1; a single-phase AC asynchronous motor M1; a rectifier bridge D1 (a high-power diode rectifier bridge) or a second inverter (an AC to DC inverter); and a charger QL.

The AC motor is provided with a commercially available speed controller for controlling the speed of the AC motor.

The battery E is a battery pack or a single battery. The battery E is provided with a power manager for management of charging and discharging of the battery. The power manager employs a commercially available power manager module.

An anode and a cathode of the battery E are connected to input ends 1, 2 of the single-phase inverter INV1, respectively. One output end 4 of the single-phase inverter INV1 is connected to one end 1 of a primary coil L1 of the single-phase inductor. The other output end 3 of the single-phase inverter INV1 is connected to the single-phase AC asynchronous motor M1. The other end 2 of the primary coil L1 of the single-phase inductor is connected to the AC motor to form a circuit. The speed controller is used to control the speed of the AC motor.

Output ends 3, 4 of a secondary coil L2 of the single-phase inductor are connected to input ends 1, 2 of the rectifier bridge D1 or the second inverter, respectively. Output ends 3, 4 of the rectifier bridge D1 are connected to the anode and the cathode of the battery, respectively.

The charger QL is connected to the anode and the cathode of the battery E for supplying power.

Example 2

Figure 2:
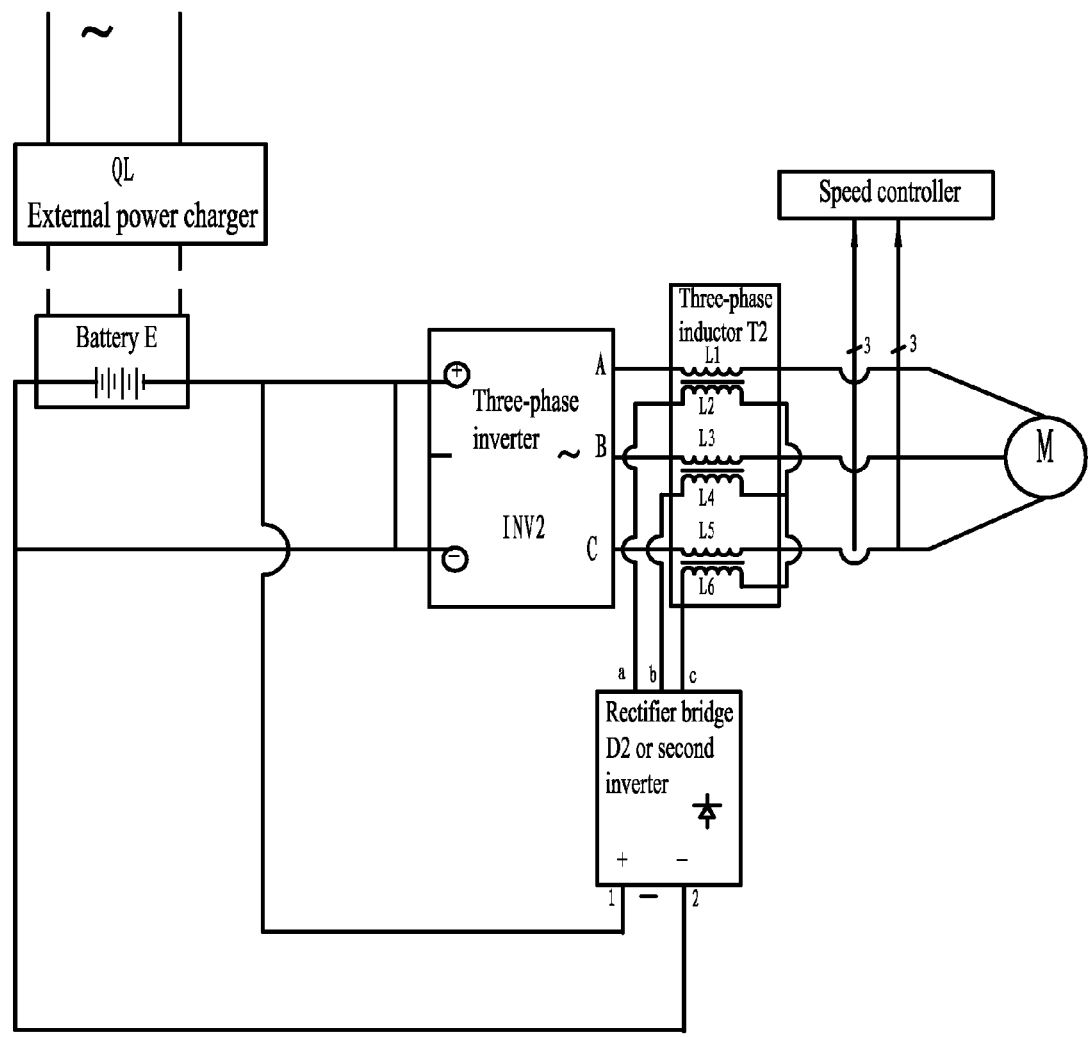
FIG. 2 is a structure diagram of a device for recovering electric energy in an AC motor-driven electric vehicle in accordance with Example 2.

As shown in FIG. 2, a device for recovering electric energy in an AC motor-driven electric vehicle, comprises: a battery E; a three-phase inverter INV2 (a DC to AC inverter); a three-phase inductor T2; a three-phase AC asynchronous motor M2; a rectifier bridge D2 (a high-power diode rectifier bridge) or a second inverter (an AC to DC inverter); and a charger QL.

The AC motor is provided with a commercially available speed controller for controlling the speed of the AC motor.

The battery E is a battery pack or a single battery. The battery E is provided with a power manager for management of charging and discharging of the battery. The power manager employs a commercially available power manager module.

An anode and a cathode of the battery E are connected to input ends 1, 2 of the three-phase inverter INV2, respectively. Output ends A, B, and C of the three-phase inverter INV2 are connected the three-phase AC asynchronous motor M2 via primary coils L1, L3, and L5 of the three-phase inductor T2, respectively. The three-phase inductor T2 employs a "Y" connection method to form a circuit. The speed controller is used to control the speed of the three-phase AC asynchronous motor M2.

Output ends of secondary coils L2, L4, and L6 of the three-phase inductor are connected to input ends a, b, and c of the rectifier bridge D2 or the second inverter, respectively. Output ends 1, 2 of the rectifier bridge D2 are connected to the anode and the cathode of the battery, respectively.

The charger QL is connected to the anode and the cathode of the battery E for supplying power.

Example 3

Figure 3:
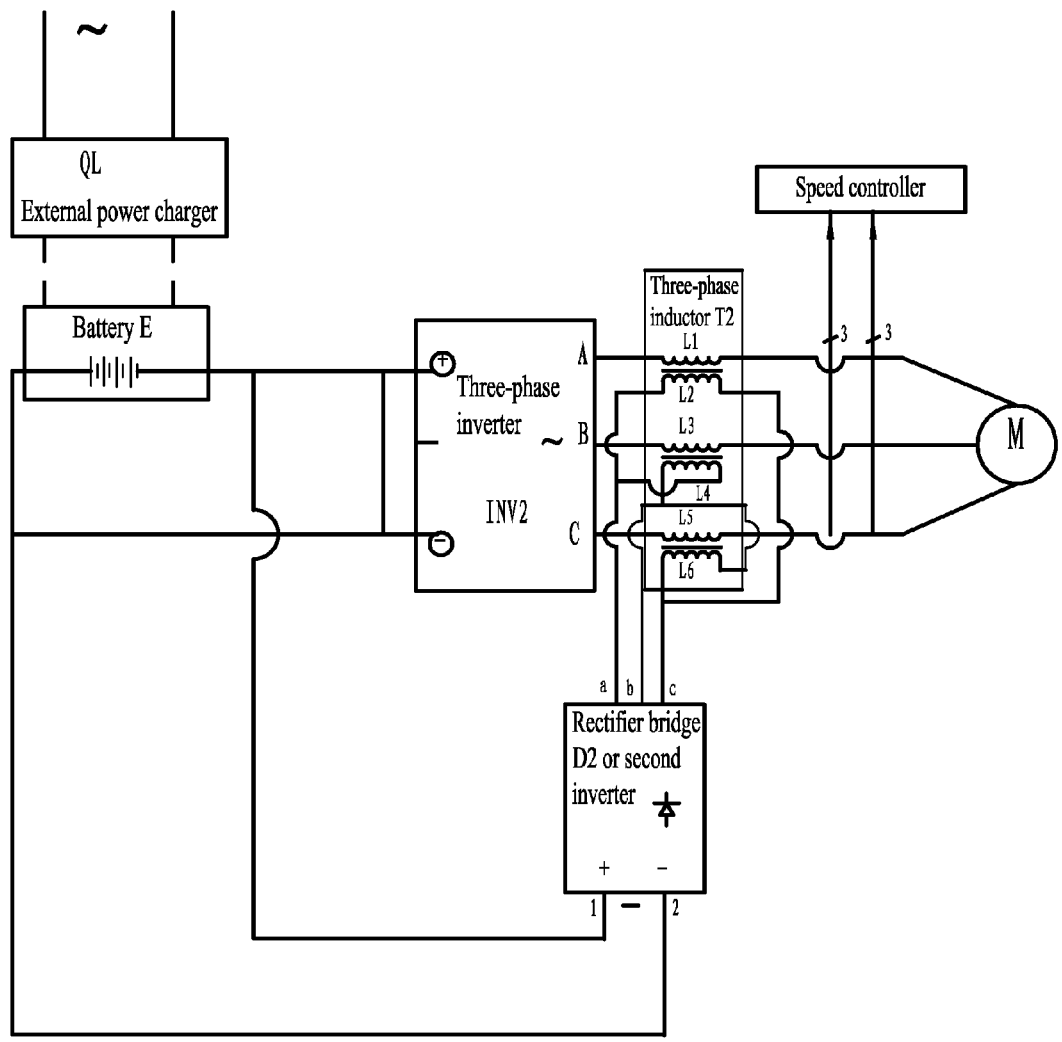
FIG. 3 is a structure diagram of a device for recovering electric energy in an AC motor-driven electric vehicle in accordance with Example 3.

As shown in FIG. 3, a device for recovering electric energy in an AC motor-driven electric vehicle, comprises: a battery E; a three-phase inverter INV2 (a DC to AC inverter); a three-phase inductor T2; a three-phase AC asynchronous motor M2; a rectifier bridge D2 (a high-power diode rectifier bridge) or a second inverter (an AC to DC inverter); and a charger QL.

The AC motor is provided with a commercially available speed controller for controlling the speed of the AC motor.

The battery E is a battery pack or a single battery. The battery E is provided with a power manager for management of charging and discharging of the battery. The power manager employs a commercially available power manager module.

An anode and a cathode of the battery E are connected to input ends 1, 2 of the three-phase inverter INV2, respectively. Output ends A, B, and C of the three-phase inverter INV2 are connected the three-phase AC asynchronous motor M2 via primary coils L1, L3, and L5 of the three-phase inductor T2, respectively. The three-phase inductor T2 employs a "Δ"

connection method to form a circuit. The speed controller is used to control the speed of the three-phase AC asynchronous motor M2.

Output ends of secondary coils L2, L4, and L6 of the three-phase inductor are connected to input ends a, b, and c of the rectifier bridge D2 or the second inverter, respectively. Output ends 1, 2 of the rectifier bridge D2 are connected to the anode and the cathode of the battery, respectively.

The charger QL is connected to the anode and the cathode of the battery E for supplying power.

The single-phase or three-phase inductor comprises: a magnetic core, a coil, a mounting bracket, a skeleton, and an insulating material. The magnetic core is made of a ferrite, a rare earth magnetic material, or a silicon steel sheet. The magnetic core uses a magnetic ring, a magnetic cylinder, and the like to form a magnetic circuit. The coil is made of an enamel-covered wire or other insulating conductive material. The single-phase or three-phase inductor is assembled by winding the coil on the skeleton, inserting the magnetic core inside the coil, fixing the coil on the mounting bracket, and using the insulating material for package.

The rectifier bridge is commercially available.

The single-phase or three-phase inverter and the second inverter are commercially available.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for recovering electric energy in an AC motor-driven electric vehicle, the device comprising:
   a) a battery;
   b) a first single-phase or three-phase inverter;
   c) a single-phase or three-phase inductor, the single-phase or three-phase inductor comprising a primary coil and a secondary coil;
   d) an AC motor;
   e) a rectifier bridge or a second single-phase or three-phase inverter; and
   f) a charger;
wherein:
   an anode of the battery and a cathode of the battery are connected to input ends of the first single-phase or three-phase inverter, respectively;
   an output end of the first single-phase or three-phase inverter is connected to the AC motor via the primary coil;
   an output end of the secondary coil is connected to an input end of the rectifier bridge or the second single-phase or three-phase inverter;
   output ends of the rectifier bridge or the second single-phase or three-phase inverter are connected to the anode and the cathode of the battery, respectively;
   the single-phase or three-phase inductor is employed to rectify the current of the device and regulate the voltage of the device;
   the primary coil is in series connection with the AC motor;
   when the AC motor works, the current on the primary coil and the voltage on the primary coil induce the secondary coil to produce an AC current and an AC voltage on the secondary coil, the AC current and the AC voltage are rectified and inverted into a direct current by the rectifier bridge or the second single-phase or three-phase inverter, and the direct current is input to the battery;
   the secondary coil is in series connection with the rectifier bridge or the second single-phase or three-phase inverter and the battery; and
   the charger is connected to the anode of the battery and the cathode of the battery.

2. The device of claim 1, wherein
   the single-phase or three-phase inductor comprises: a magnetic core, a coil, a mounting bracket, a skeleton, and an insulating material; and
   the single-phase or three-phase inductor is assembled by winding the coil on the skeleton, inserting the magnetic core inside the coil, fixing the coil on the mounting bracket, and using the insulating material for package.

3. The device of claim 2, wherein the coil is made of an enamel-covered wire or an insulating conductive material.

4. The device of claim 1, wherein the AC motor is provided with a speed controller for controlling a rotary speed of the AC motor.

5. The device of claim 1, wherein the battery is a battery pack or a single battery.

6. The device of claim 1, wherein the battery comprises a power manager for management of charging and discharging of the battery.

7. A device for driving an AC motor, the device comprising:
   a) a battery;
   b) a first inverter;
   c) an inductor, the inductor comprising a primary coil and a secondary coil; and
   d) a second inverter;
wherein:
   an anode of the battery and a cathode of the battery are connected to input ends of the first inverter, respectively;
   an output end of the first inverter is connected to the AC motor via the primary coil;
   an output end of the secondary coil is connected to an input end of the second inverter;
   output ends of second inverter are connected to the anode and the cathode of the battery, respectively;
   the primary coil is in series connection with the AC motor; and
   the secondary coil is in series connection with the second inverter and the battery.

8. The device of claim 7, further comprising a charger, wherein the charger is connected to the anode of the battery and the cathode of the battery.

9. The device of claim 8, wherein the battery comprises a power manager for management of charging and discharging of the battery.

10. The device of claim 7, wherein
    the inductor comprises a magnetic core, a coil, a mounting bracket, a skeleton, and an insulating material; and
    the inductor is assembled by winding the coil on the skeleton, inserting the magnetic core inside the coil, fixing the coil on the mounting bracket, and using the insulating material for package.

11. The device of claim 10, wherein the coil is an enamel-covered wire or an insulating conductive material.

12. The device of claim 7, further comprising a speed controller, wherein the speed controller is connected to the AC motor and is adapted to control a rotary speed of the AC motor.

* * * * *